March 27, 1928.

F. GOODALL 1,663,697

BEAD RING REMOVER FOR USE IN TIRE FACTORIES

Filed April 24, 1925    3 Sheets-Sheet 1

INVENTOR.
FRED GOODALL

BY

ATTORNEY.

March 27, 1928.

F. GOODALL 1,663,697

BEAD RING REMOVER FOR USE IN TIRE FACTORIES

Filed April 24, 1925   3 Sheets-Sheet 2

INVENTOR.
FRED GOODALL

BY

ATTORNEY.

March 27, 1928.  1,663,697
F. GOODALL
BEAD RING REMOVER FOR USE IN TIRE FACTORIES
Filed April 24, 1925  3 Sheets-Sheet 3
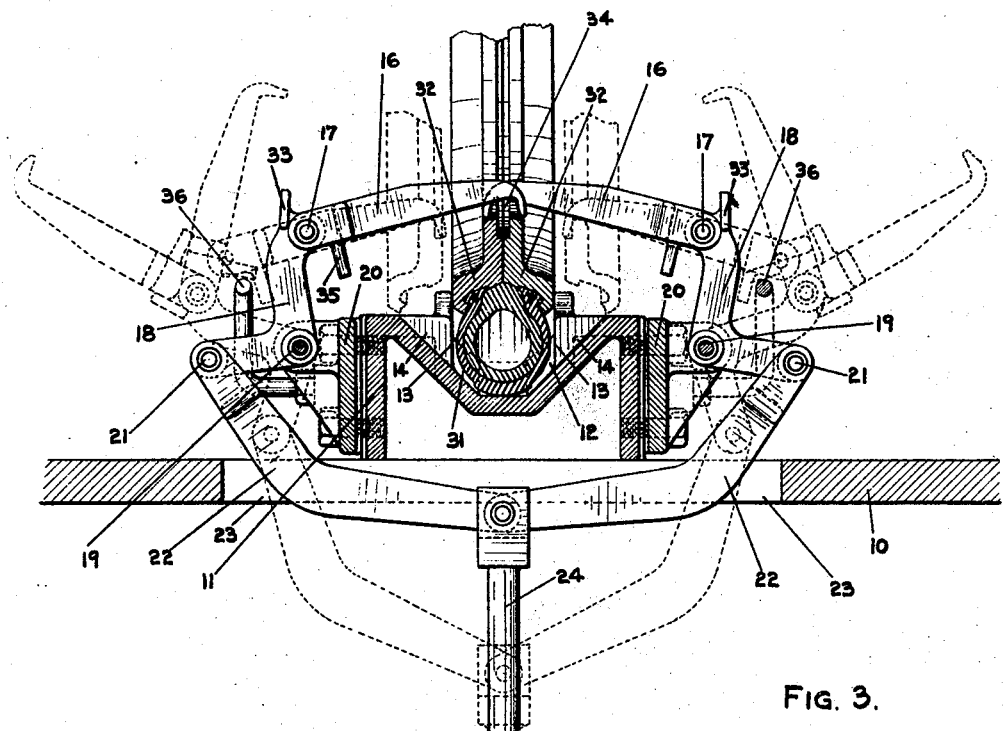
FIG. 3.
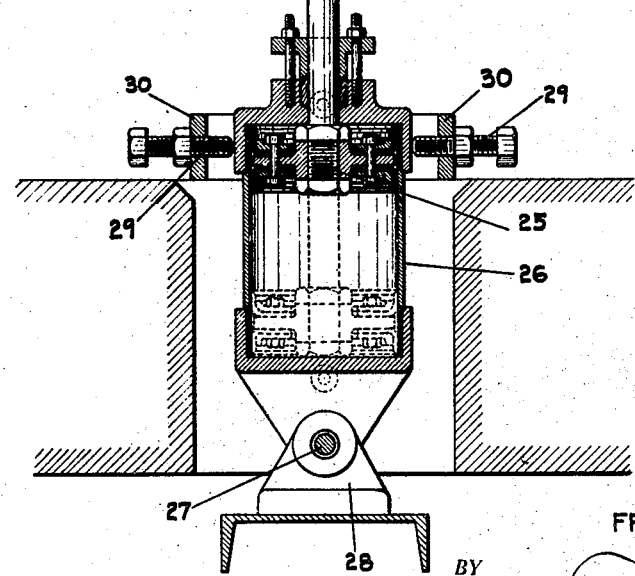
INVENTOR.
FRED GOODALL.
BY
ATTORNEY.

Patented Mar. 27, 1928.

1,663,697

UNITED STATES PATENT OFFICE.

FRED GOODALL, OF AKRON, OHIO, ASSIGNOR TO THE FIRESTONE TIRE AND RUBBER COMPANY, OF AKRON, OHIO, A CORPORATION OF OHIO.

BEAD-RING REMOVER FOR USE IN TIRE FACTORIES.

Application filed April 24, 1925. Serial No. 25,473.

This invention relates to devices for use in connection with the vulcanization of tires and especially to a device for separating and loosening or removing bead molding or "bull" rings from the vulcanized tires, which rings tend strongly to adhere to the tires as a result of being in contact therewith during the vulcanizing process.

Heretofore in the art, it has been customary to remove the "bull" rings by hand tools of various descriptions. This has required the use in large factories of a large number of employees for this specific purpose, and because of the difficulty in breaking the adhesion between the metal ring and the rubber, great strength and considerable time has been required for this operation.

The chief object of the present invention is to provide a machine for performing the above operations and particularly a machine which is cheap to construct, easy to operate, highly efficient to accomplish the purpose easily and rapidly, and simple in construction whereby maintenance is low.

Another object is to provide means for readily receiving and supporting a vulcanized tire carrying the bull rings to prevent shifting of the tire axially and to provide ring-engaging members movable toward and from the tire to hook onto the bead rings and pull them away from the tire axially thereof.

Another object is to provide a hook-like ring pulling member movable over the bead ring axially of the tire, then downwardly into engagement with the inner edge of the ring, then outwardly axially of the tire to separate the ring therefrom, then upwardly out of engagement with the ring etc.

The foregoing and ancillary objects are obtained by the construction illustrated in the accompanying drawings and described in detail below. It is to be understood that the invention is not limited to the specific construction shown and described.

Of the accompanying drawings;

Figure 3 is a section on line 3—3 in Figures 1 and 2.

Figure 1:
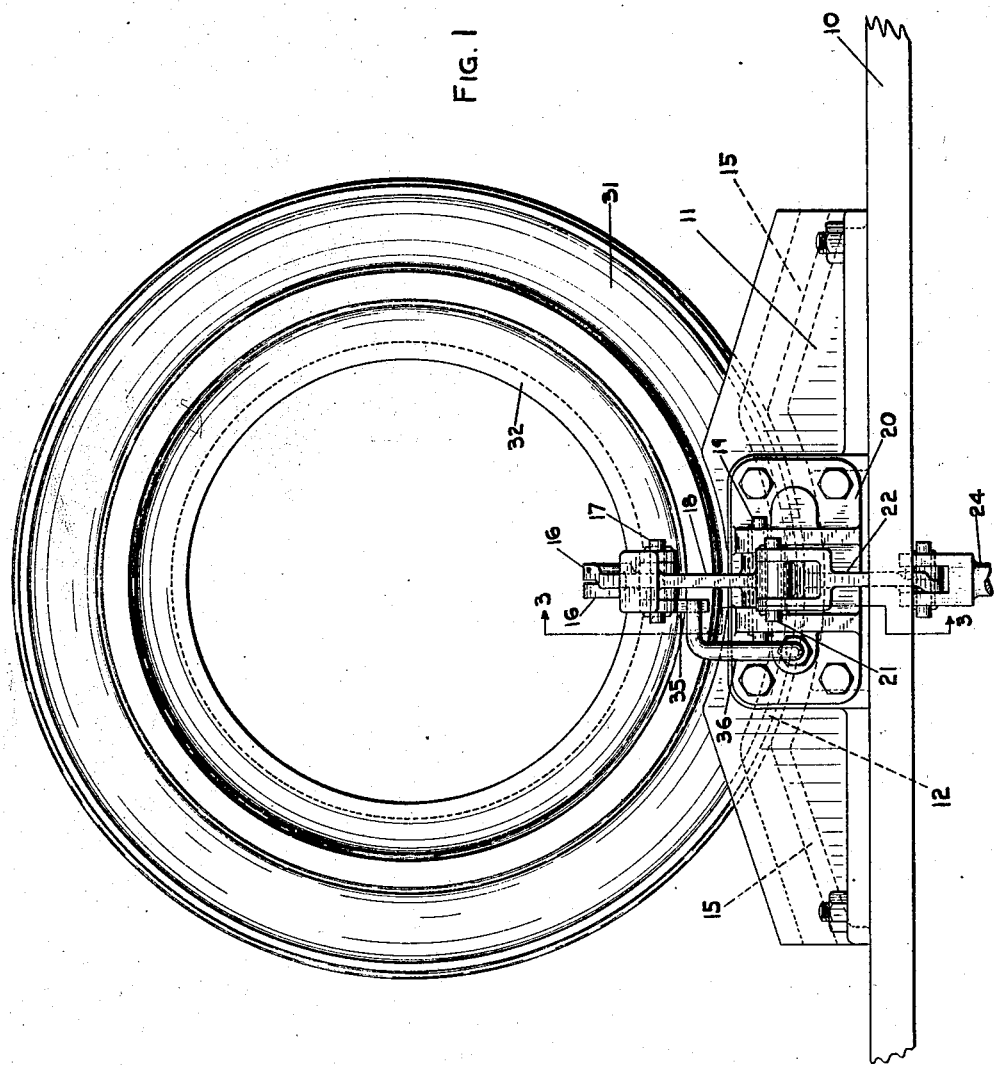
Figure 1 is a side elevation of the main part of a device embodying the invention and showing a vulcanized tire having bead rings thereon mounted thereon.

Referring to the drawings, 10 indicates a suitable platform on which is mounted a tire receiving and supporting casting 11 formed with a tire-receiving groove 12, the surface of which is of an arc-shape corresponding to the periphery of a tire, the walls 13, 13 of the groove being substantially perpendicular throughout the length of groove 12 except at 14, 14 at the longitudinal center of said groove where the walls are inclined upwardly from the bottom of groove 12 at an angle substantially of 45° for a purpose later to be explained.

To permit easy rolling of a tire into position in groove 12 for the removal of the rings and out of such position after such removal, casting 11 is preferably formed with opposite inclined grooves 15, 15 up or down either of which the tires may be rolled into or from position. The grooves 15 are of a formation similar to groove 12 in section as will be understood.

Figure 2:
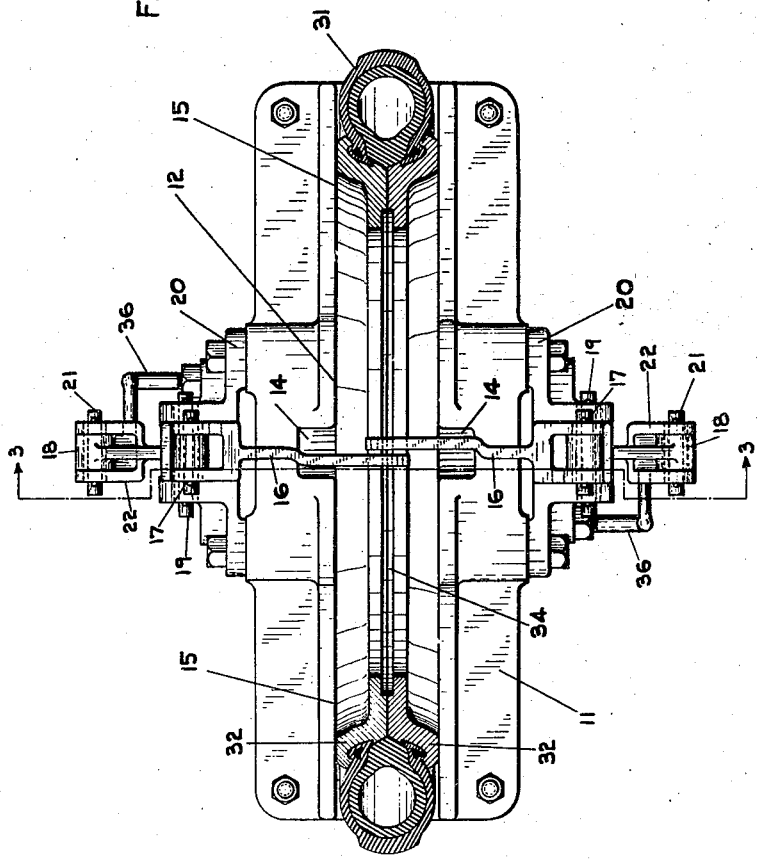
Figure 2 is a plan thereof.

The instrumentalities for engaging and removing or loosening the bead rings consist in hook members 16, 16, pivoted at 17, 17 on bell cranks 18, 18 which latter are pivoted at 19, 19 on brackets 20, 20 secured on opposite sides of casting 11 at the center thereof (Figure 2). Hingedly connected to each bell crank 18 at 21, 21 is link 22, 22 extending down through an opening 23 in platform 10 and both connected to a single reciprocatory rod 24 which may be reciprocated in any suitable manner as by means of a piston 25 in a hydraulic or pneumatic cylinder 26 provided with suitable controls (not shown). The cylinder 26 is mounted so as to adjust the line of reciprocation of rod 24 by being pivoted at 27 on a bracket 28 and held in the desired substantially vertical position by set screws 29, 29 engaging opposite sides of the cylinder, the screws 29 being threaded through fixed brackets 30, 30.

Operation of rod 24 is effected through links 22 and bell cranks 18 to move pivoted hooks 16 toward and from each other and toward and away from a tire indicated at 31 having bead rings 32, 32 thereon. In order that the hooks 16 will first pass axially of the tire over the rings 32 and then downwardly into engagement therewith, the hooks are so pivoted as to be maintained by gravity in engagement with stops 33 formed on bell cranks 18 when in the outer positions of the hooks shown in dotted lines in Figure 3 and while they are being moved inwardly toward each other until the stops 33 approach the full line positions in Figure 3 whereupon gravity will be effective to cause the hooks to drop into the full line positions on the rings.

The inner peripheries of the rings 32 are spaced from each other as shown at 34 whereby when the hooks are moved outwardly from the full line positions (Figure 3) they will drop by gravity into engagement with the inner edges of the rings 32 and on continued outward movement will draw the rings 32 away from tire 31 to the dotted line positions shown in Figure 3. In order to then lift the hooks 16 out of engagement with rings 32 and to return them back onto stops 33 ready for the next operation, upon further movement of the hooks outwardly by cranks 18, each hook is formed with a projection 35, 35 adapted to engage a rod 36, 36 in the path of each projection 35 and positioned at such a point in said path as to effect upward swinging of each hook 16 by engagement with its projection 35 after sufficient separation of the rings 32 from tire 31 is effected by the hooks. In the event that the device should be actuated while no tire is positioned therein, the walls 14 are formed as above described so that the hooks which will drop into groove 12 will slide out of said groove when moved outwardly without binding on casting 11.

The operation which will be understood from the foregoing may be summarized briefly as follows. Cured tires 31 having rings 32 thereon are rolled up one inclined groove 45 into the position shown in the drawings in groove 12. The hooks 16 are normally in the outermost dotted line position shown in Figure 3. A single reciprocation of piston 25 is then effected in any suitable manner. This first swings cranks 18 inwardly carrying the hooks 16 inwardly until they drop by gravity onto the rings 32 as shown best in Figure 3. Then cranks 18 are swung outwardly by the piston 25, first causing hooks 16 to drop in back of the inner edges of rings 32, then drawing the rings away from the tire 31 as indicated by the dotted line positions thereof shown in Figure 3, walls 13 of groove 12 preventing any axial movement of tire 31. After sufficient separation of the rings 32 from the tire 31 has been thus effected, continued movement of the hooks outwardly causes projections 35 to engage rods 36 whereby hooks 16 will swing upwardly out of engagement with rings 32 onto the stops 33 where they will be maintained by gravity until the next operation of the device.

The rings 32 are now lifted off the device and tire 31 is rolled down the other groove 45 while another tire having the rings 32 thereon may be rolled up the first groove 45 into position for the next ring removing operation of the device.

It will appear from the foregoing that a simple, effective apparatus has been provided for performing easily and cheaply what heretofore has been performed by hand with considerable difficulty and expense. The present inventor believes himself to be the first to devise a machine for performing such an operation and accordingly the appended claims should be construed liberally and broadly. It is accordingly obvious that modifications of the invention may be resorted to without departing from the spirit thereof or the scope of the appended claims.

What is claimed is:

1. Apparatus of the class described, said apparatus comprising a support formed with an arc shaped groove for receiving a tire, an inclined runway leading to said support, a sloping runway leading from said support, and means for separating "bull" rings carried by a tire from the tire when on said support, said means including a pair of bellcranks pivoted on opposite sides of the support, hooks pivoted onto said cranks, means for simultaneously swinging said cranks toward and from each other axially of the tire, means controlling said hooks to first carry them over the rings then into engagement therewith as the cranks move inwardly axially of the tire, said means including a stop member on each crank on which the hooks normally rest by gravity and means for controlling said hooks as the cranks move outwardly axially of the tire to lift said hooks off of said rings and return them to engagement with the stop members, said means including a projection on each hook and fixed members in the paths of projections of the hooks in the movement of the latter outwardly axially of the tire.

2. Apparatus of the class described, said apparatus comprising a support formed with an arc shaped groove for receiving a tire, and means for separating "bull" rings carried by a tire from the tire when on said support, said means including a pair of bellcranks pivoted on opposite sides of the support, hooks pivoted onto said cranks, means for simultaneously swinging said cranks toward and from each other axially of the tire, means controlling said hooks to first carry them over the rings then into engagement therewith as the cranks move inwardly axially of the tire, said means including a stop member on each crank on which the hooks normally rest by gravity and means for controlling said hooks as the cranks move outwardly axially of the tire to lift said hooks off of said rings and return them to engagement with the stop members, said means including a projection on each hook and fixed members in the paths of projections of the hooks in the movement of the latter outwardly axially of the tire.

3. Apparatus of the class described comprising means for receiving and supporting a tire against axial displacement, and means for separating bull rings from said tire, said means including hooks movable into engagement with said rings axially from opposite sides of the tire, and means for moving said hooks over said rings, then into engagement with the inner edges thereof, then outwardly axially of the tire and finally out of engagement with said rings, said means including bell-cranks on which the hooks are pivoted, stop members on the cranks for normally supporting the hooks held thereon by gravity, projections on the hooks, fixed members in the paths of the projections on said hooks for lifting the latter onto said stop members, and means for first simultaneously operating the cranks to move the hooks toward the tire axially thereof and subsequently operating the cranks to move the hooks away from the tire axially thereof.

4. Apparatus of the class described comprising means for receiving and supporting a tire against axial displacement, and means for separating a bull ring from said tire, said means including a hook movable into engagement with said ring axially of the tire, and means for moving said hook over said ring, then into engagement with the inner edge thereof, then outwardly axially of the tire and finally out of engagement with said ring, said means including a bell-crank on which the hook is pivoted, a stop member on the crank for normally supporting the hook held thereon by gravity, a projection on the hook, a fixed member in the path of the projection on said hook for lifting the latter onto said stop member, and means for first operating the crank to move the hook toward the tire axially thereof and subsequently operating the crank to move the hook away from the tire axially thereof.

5. Apparatus of the class described comprising means for receiving and supporting a tire against axial displacement, and means for separating bull rings from said tire, said means including hooks movable into engagement with said rings axially from opposite sides of the tire, and means for moving said hooks over said rings, then into engagement with the inner edges thereof, then outwardly axially of the tire and finally out of engagement with said rings.

6. Apparatus of the class described comprising means for receiving and supporting a tire against axial displacement, and means for separating a bull ring from said tire, said means including a hook movable into engagement with said ring axially of the tire, and means for moving said hook over said ring, then into engagement with the inner edge thereof, then outwardly axially of the tire and finally out of engagement with said ring.

7. Apparatus of the class described comprising means for supporting a tire having a bull ring thereon and means for removing said bull ring from said tire, said means being movable toward the tire to engage the ring, away from the tire to separate the ring from the tire and finally away from the ring into a position ready for the next removing operation.

8. Apparatus for separating molding elements from the sides of vulcanized tires, said apparatus comprising means for supporting and embracing a tire to hold it against axial displacement and spreading, and means for engaging a ring on said tire and separating it axially from the tire.

9. Apparatus of the class described comprising means for supporting a tire against axial displacement and spreading and means for simultaneously engaging rings on opposite sides of said tires and separating them from the tire axially in opposite directions.

10. Apparatus of the class described comprising a pivoted hook, means for bodily moving the hook in one direction in an elevated position and for bodily moving the hook in an opposite direction in a lowered position, and means adapted to elevate said hook during movement in the last direction.

11. Apparatus of the class described comprising a movable member, a hook pivoted thereon and normally resting by gravity in an elevated position on said member, means for moving said member in one direction to cause said hook to swing from its normal position thereon to a lower position, said means being operable to move the member in an opposite direction, a projection on said hook, and a fixed member in the path of said projection whereby as the member is moved in the opposite direction said hook will be elevated by said fixed member into its elevated position on said movable member.

FRED GOODALL.